United States Patent
Dong

(10) Patent No.: US 12,428,065 B2
(45) Date of Patent: Sep. 30, 2025

(54) ALL-TERRAIN VEHICLE

(71) Applicant: Segway Technology Co., Ltd., Changzhou (CN)

(72) Inventor: Zhen Dong, Changzhou (CN)

(73) Assignee: Segway Technology Co., Ltd., Changzhou (CN)

(*) Notice: Subject to any disclaimer, the term of this patent is extended or adjusted under 35 U.S.C. 154(b) by 293 days.

(21) Appl. No.: 18/456,104

(22) Filed: Aug. 25, 2023

(65) Prior Publication Data
US 2024/0067271 A1 Feb. 29, 2024

(30) Foreign Application Priority Data
Aug. 25, 2022 (CN) .......................... 202222251094.2

(51) Int. Cl.
| | | |
|---|---|---|
| *B62D 21/18* | (2006.01) | |
| *B60K 1/04* | (2019.01) | |
| *B60K 15/063* | (2006.01) | |

(52) U.S. Cl.
CPC .............. *B62D 21/183* (2013.01); *B60K 1/04* (2013.01); *B60K 15/063* (2013.01); *B60K 2001/0411* (2013.01); *B60K 2015/0637* (2013.01)

(58) Field of Classification Search
CPC ...... B62D 21/183; B60K 1/04; B60K 15/063; B60K 2001/0411; B60K 2015/0637
See application file for complete search history.

(56) References Cited

U.S. PATENT DOCUMENTS

2022/0097511 A1* 3/2022 Wang .................. B60K 1/04
2022/0388580 A1* 12/2022 Li ...................... B62D 21/10

FOREIGN PATENT DOCUMENTS

WO WO-2020248569 A1 * 12/2020 .......... B62D 21/183
WO WO-2020248575 A1 * 12/2020 .......... B62D 23/00

* cited by examiner

*Primary Examiner* — Joseph J Dallo
(74) *Attorney, Agent, or Firm* — Osha Bergman Watanabe & Burton LLP

(57) ABSTRACT

An all-terrain vehicle includes a vehicle frame, seats, and a fuel tank. The vehicle frame defines a cockpit. The seats include a driver seat and a co-driver seat. The driver seat and the co-driver seat are arranged in the cockpit, the cockpit is provided with a driver foot space in front of the driver seat, and the cockpit is also provided with a co-driver foot space in front of the co-driver seat. The fuel tank is arranged in the cockpit, and is located between the driver foot space and the co-driver foot space.

20 Claims, 3 Drawing Sheets

ALL-TERRAIN VEHICLE

CROSS-REFERENCE TO RELATED APPLICATIONS

The present application claims the benefit of priority to Chinese Application No. 202222251094.2, filed on Aug. 25, 2022, the contents of which are incorporated herein by reference in their entireties for all purposes.

FIELD

The present disclosure relates to the field of all-terrain vehicles, and in particular to an all-terrain vehicle.

BACKGROUND

In the related art, a fuel tank of side-by-side seating all-terrain vehicles is usually arranged on a right side. When only a driver is in a cockpit, the driver is on a left side of the cockpit, but when the fuel tank has sufficient fuel, a weight of the fuel tank has a certain counterweight effect, which can reduce a weight ratio of the left and right sides of the row-seat all-terrain vehicles as much as possible.

SUMMARY

According to embodiments of the present disclosure, there is provided with an all-terrain vehicle. The all-terrain vehicle includes: a vehicle frame, a driver seat and a co-driver seat, and a fuel tank. The vehicle frame defines a cockpit. The driver seat and the co-driver seat are arranged in the cockpit, the cockpit is provided with a driver foot space in front of the driver seat, and a co-driver foot space in front of the co-driver seat. The fuel tank arranged in the cockpit, and the fuel tank is located between driver foot space and the co-driver foot space.

BRIEF DESCRIPTION OF THE DRAWINGS

The above and/or additional aspects and advantages of the present disclosure will be obvious and easy to understand from the description of the embodiment with the following drawings, wherein.

DETAILED DESCRIPTION

Figure 1:
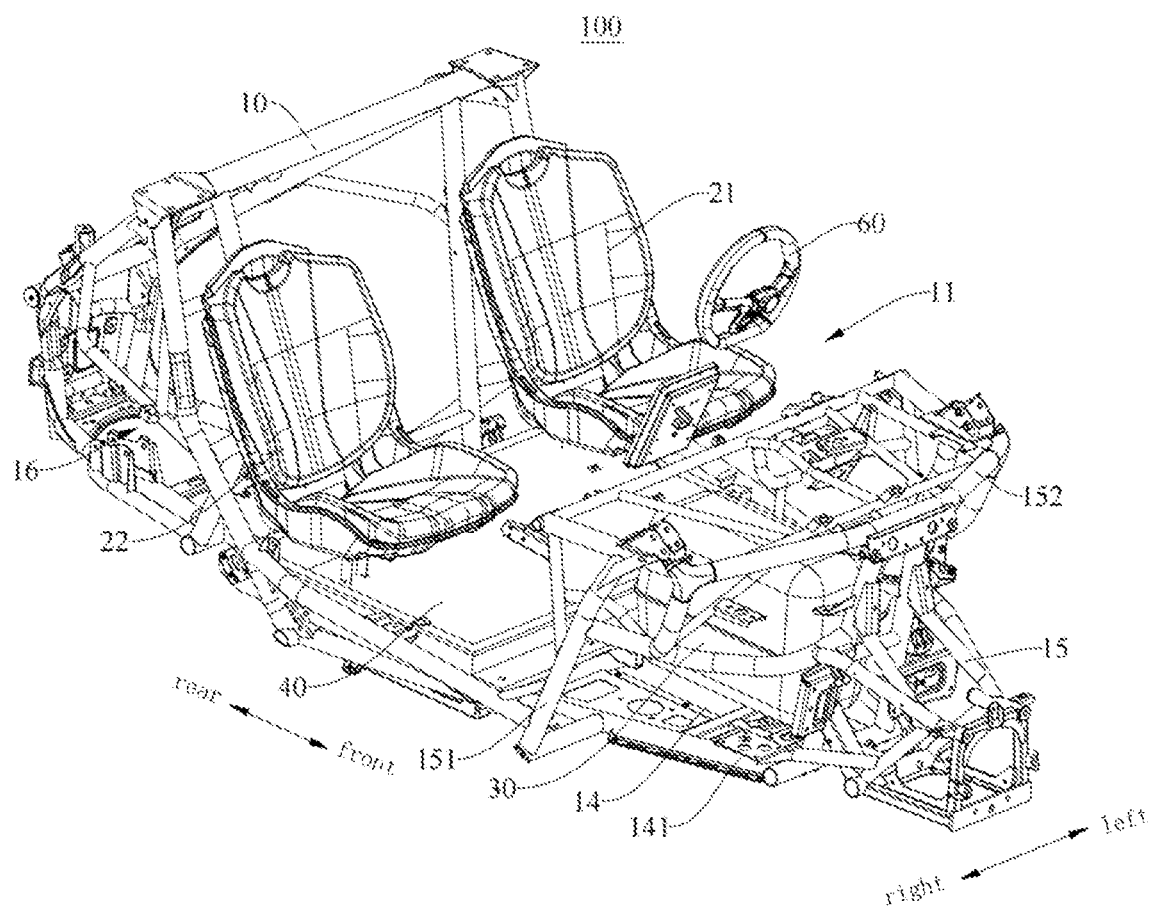
FIG. 1 is a schematic structural view of the all-terrain vehicle according to an embodiment of the present disclosure.

Embodiments of the present disclosure will be described in detail below. The embodiment described with reference to the attached drawings is exemplary. Embodiments of the present disclosure will be described in detail below.

In the related art, as the fuel in the fuel tank is exhausted, the counterweight effect will gradually weaken or disappear, which will bring potential safety hazards to the driving of the row-seat all-terrain vehicles.

The present disclosure aims at solving at least one of the technical problems existing in the related art. Therefore, the present disclosure provides an all-terrain vehicle. By arranging a fuel tank between a driver foot space and the co-driver foot space, arrangement of the fuel tank can be facilitated, and counterweight function of the fuel tank will not weaken or disappear during normal driving of the all-terrain vehicle.

Hereinafter, an all-terrain vehicle according to embodiments of the present disclosure will be described with reference to FIGS. 1 to 4.

Referring to FIGS. 1-4, the all-terrain vehicle 100 of embodiments of the present disclosure includes a frame 10 and seats 20. The vehicle frame 10 defines a cockpit 11, and seats 20 include a driver seat 21 and a co-driver seat 22. The driver seat 21 and the co-driver seat 22 are arranged in the cockpit 11, and the cockpit 11 is provided with a driver foot space 12 in front of the driver seat 21, and the cockpit 11 is also provided with a co-driver foot space 13 in front of the co-driver seat 22. Specifically, the driver seat 21 is arranged at a left side of the all-terrain vehicle 100, and the co-driver driver is arranged at a right side of the all-terrain vehicle 100. Moreover, the all-terrain vehicle 100 further includes a steering wheel 60, and the steering wheel 60 is arranged at a front side of the driver seat 21 and a rear side of the driver foot space 12.

In addition, the all-terrain vehicle 100 also includes a fuel tank 30, and the fuel tank 30 is arranged in the cockpit 11 and located between the driver foot space 12 and the co-driver foot space 13. In this way, the fuel tank 30 is arranged at the front side of the cockpit 11, specifically, between the driver foot space 12 and the co-driver foot space 13, the space of the cockpit 11 can be reasonably utilized. Moreover, the fuel tank 30 separates the driver foot space 12 from the co-driver foot space 13, which can improve the safety of the all-terrain vehicle 100 when driving, that is, preventing the passenger from stepping on the accelerator and braking by mistake.

Moreover, the fuel tank 30 is arranged between the driver foot space 12 and the co-driver foot space 13, that is, the fuel tank 30 is arranged in a middle position of the all-terrain vehicle 100 in the left-right direction, so that the weight distribution of the all-terrain vehicle 100 is more reasonable, and the safety of the all-terrain vehicle 100 during driving is improved. Moreover, when the all-terrain vehicle 100 runs normally, although the fuel in the fuel tank 30 is reduced, the counterweight function of the fuel tank 30 will never weaken or disappear, further ensuring the safety of the all-terrain vehicle 100 during driving.

Therefore, by arranging the fuel tank 30 between the driver foot space 12 and the co-driver foot space 13, the arrangement of the fuel tank 30 can be facilitated, and the counterweight function of the fuel tank 30 will not weaken or disappear during the normal driving of the all-terrain vehicle 100.

Figure 2:
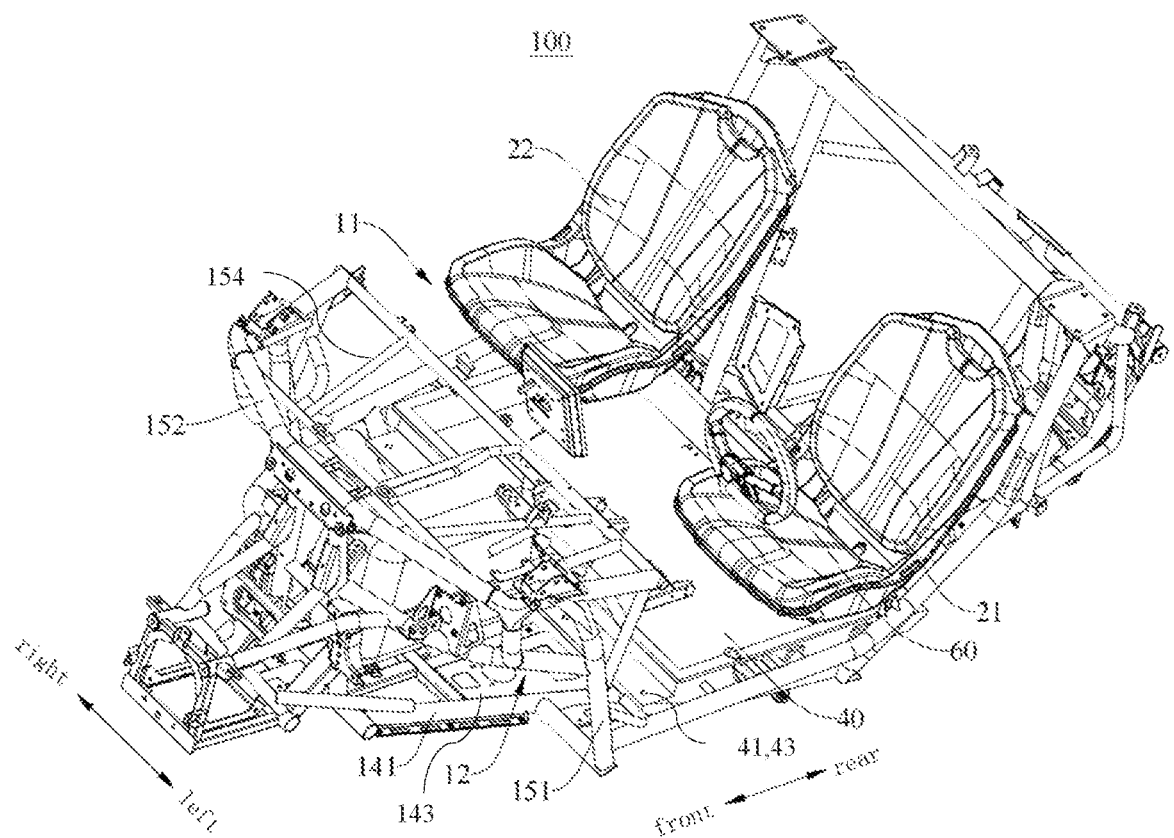
FIG. 2 is a schematic structural view of the all-terrain vehicle from another angle according to the embodiment of the present disclosure.
Figure 3:
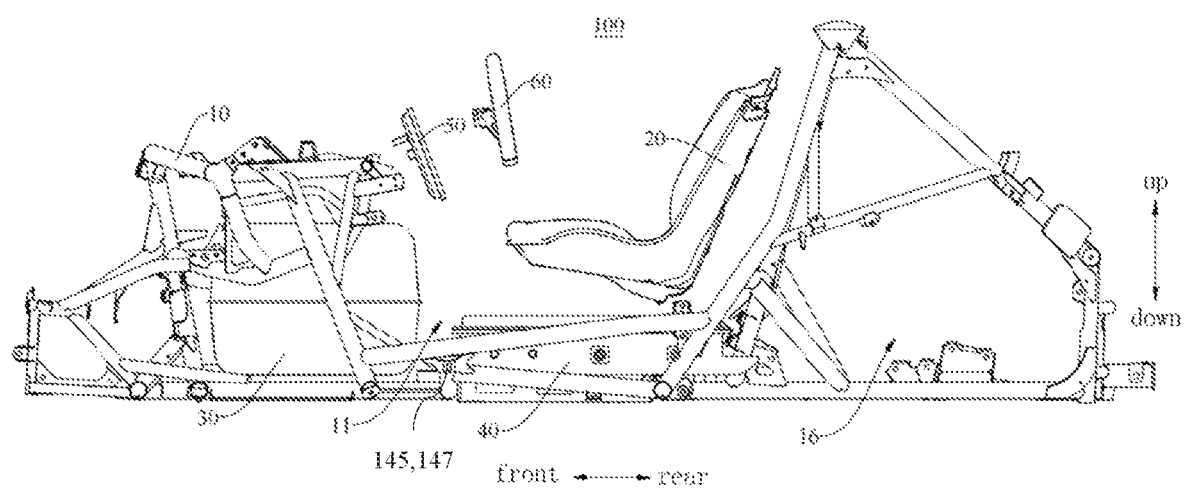
FIG. 3 is a side view of the all-terrain vehicle according to an embodiment of the present disclosure.
Figure 4:
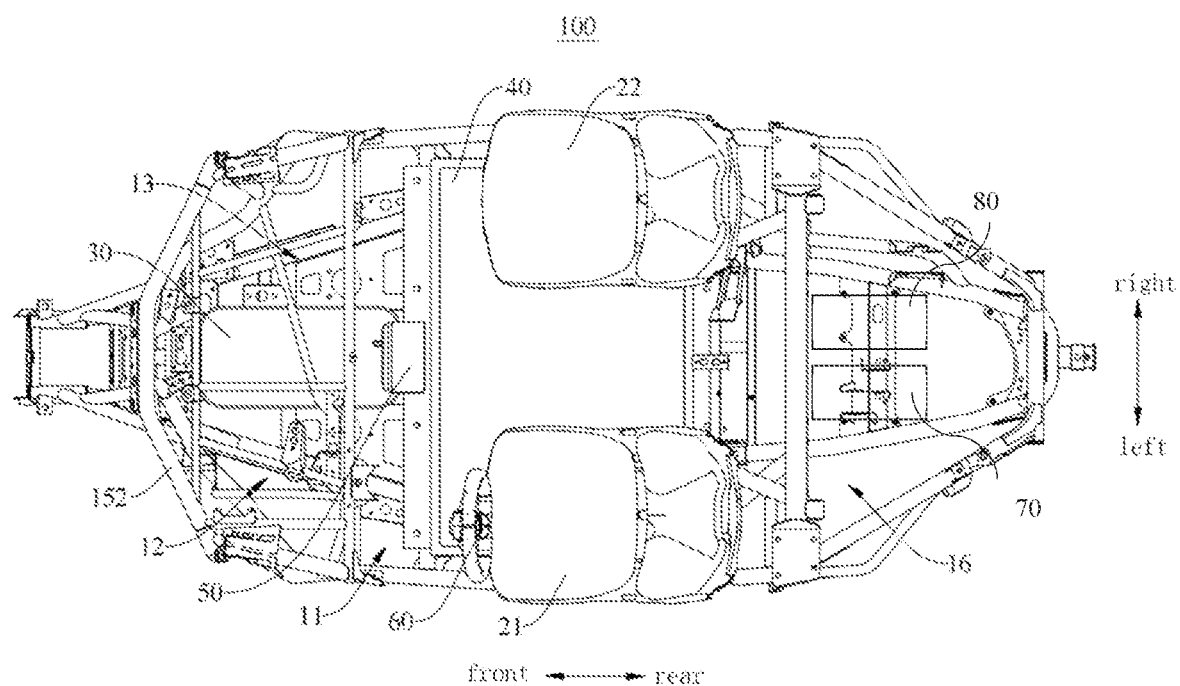
FIG. 4 is a top view of the all-terrain vehicle according to an embodiment of the present disclosure.

As illustrated in FIGS. 1-4, the all-terrain vehicle 100 also includes a power battery 40, and the power battery 40 is arranged on the vehicle frame 10 and located behind the fuel tank 30. In addition, as illustrated in FIGS. 1, 3 and 4, the vehicle frame 10 also includes a power cabin 16, and the all-terrain vehicle 100 also includes a driving motor 70 and an engine 80. The driving motor 70 and the engine 80 are arranged in the power cabin 16. The fuel tank 30 can be configured to supply fuel to the engine 80 of the all-terrain vehicle 100 to drive the all-terrain vehicle 100, and the all-terrain vehicle 100 can also use electric energy as power, that is, the power battery 40 can be configured to supply power to the driving motor 70 of the all-terrain vehicle 100 to drive the all-terrain vehicle 100. In addition, the front side of the cockpit 11 is provided with the fuel tank 30, the driver foot space and the co-driver foot space 13, and the power battery 40 can be arranged behind the fuel tank 30, so that the power battery 40 can be arranged reasonably.

In some embodiments, the power battery 40 is arranged in the cockpit 11, and the power battery 40 is located below at least one of the driver seat 21 or the co-driver seat 22. That is, the power battery 40 is located below the driver seat 21, or the power battery 40 is located below the co-driver seat 22, or the power battery 40 is located below the driver seat 21 and the co-driver seat 22. Referring to FIG. 4, a power battery 40 is arranged in the cockpit 11, and the power battery 40 is located below the driver seat 21 and the co-driver seat 22. By arranging the power battery 40 below the driver seat 21 and the passenger's seat 22, the center of gravity of the whole all-terrain vehicle 100 can be lowered, and the safety of the all-terrain vehicle 100 during driving can be further improved while the weight distribution of the whole all-terrain vehicle 100 in the left-right direction is more balanced. In addition, the power battery 40 can be made larger, that is, the energy density of the power battery 40 is greater, and the range of the all-terrain vehicle 100 in a pure electric mode is larger.

Referring to FIG. 4, a front end of the power battery 40 extends forward beyond a front end of the driver seat 21 and a front end of the co-driver seat 22, and a gap is defined between the front end of the power battery 40 and a rear end of the fuel tank 30. That is, there is a gap between the power battery 40 and the fuel tank 30, which can facilitate the interchange between the driver and the passenger, and avoid the mutual interference between the fuel tank 30 and the power battery 40, i.e., avoid the invasion of fuel tank 30 to the power battery 40 when the fuel tank 30 is deformed, or avoid the invasion of the power battery 40 to the fuel tank 30 when the power battery 40 is deformed, which can improve the driving safety of the all-terrain vehicle 100.

In addition, referring to FIGS. 1 and 2, the all-terrain vehicle 100 further includes an instrument 50, the instrument 50 is fixed to an upper part of the vehicle frame 10, and the instrument 50 is located above a rear part of the fuel tank 30. The instrument 50 is arranged above the rear part of the fuel tank 30, so that the instrument 50 can be arranged reasonably, and both the driver and the passenger can see the instrument 50. In addition, the instrument 50 is a device configured for reflecting the working conditions of various systems of the all-terrain vehicle 100, commonly such as fuel indicator lamp, cleaning liquid indicator lamp, electronic throttle indicator lamp, front and rear fog lamp indicator lamp and alarm lamp.

As illustrated in FIG. 1, the vehicle frame 10 includes an underframe 14 and a front bracket 15. The front bracket 15 is arranged at the front part of the underframe 14 and extends upward, and the bottom part of the fuel tank 30 is fixed on the underframe 14. In this way, the front bracket 15 and the underframe 14 define the driver foot space and the co-driver foot space 13. The front bracket 15 is arranged above the underframe 14 and fixed to the instrument 50. In addition, the bottom part of the fuel tank 30 is fixed on the underframe 14, so that the fuel tank 30 can be fixed by the underframe 14, to realizing the fixation of the fuel tank 30. Specifically, the fuel tank 30 may be fixed to the underframe 14 by welding, or the fuel tank 30 may be fixed to the underframe 14 by bolts.

In addition, as illustrated in FIGS. 1 and 2, the underframe 14 includes at least two bottom longitudinal beams 141. The at least two bottom longitudinal beams 141 are arranged at intervals in a transverse direction and are located at a middle part of the underframe 14 in the transverse direction, and the bottom part of the fuel tank 30 is fixed to the at least two bottom longitudinal beams 141. That is, the at least two bottom longitudinal beams 141 extend in the front-rear direction, so that the fuel tank 30 can be fixed on the two bottom longitudinal beams 141, thereby improving the connection stability of the fuel tank 30.

The underframe 14 can be composed of at least two bottom longitudinal beams 141. Of course, the underframe 14 is also provided with a bottom plate 143, and the bottom plate 143 can be fixed on the bottom longitudinal beams 141, so that the driver foot space 12 and the co-driver foot space 13 can be separated from the outside.

Referring to FIGS. 1 and 2, the front end of the fuel tank 30 is fixed to the front bracket 15. That is, the front end of the fuel tank 30 can also be fixedly coupled to the front bracket 15, so that the fixation stability of the fuel tank 30 can be improved and the fuel tank 30 can be prevented from shaking when the all-terrain vehicle 100 is running. The front bracket 15 can be directly welded with the front end of the fuel tank 30, or, the front bracket 15 can be fixedly coupled to the front end of the fuel tank 30 by bolts.

Specifically, as illustrated in FIGS. 1 and 2, the front bracket 15 includes at least two vertical beams 151. The at two vertical beams 151 are arranged at intervals in the transverse direction, and are located at a middle part of the front bracket 15 in the transverse direction, and the front end of the fuel tank 30 is fixed to the at least two vertical beams 151. The front bracket 15 is provided with four vertical beams 151, and two of the vertical beams 151 are arranged in the middle part of the front bracket 15 in the transverse direction, so that the front end of the fuel tank 30 can be fixed on the two vertical beams 151. Due to thicker diameter of the vertical beams 151, the strength of the vertical beams 151 is higher, and the fuel tank 30 is more stable when fixed on the vertical beams 151.

In addition, the other two of the vertical beams 151 of the front bracket 15 are arranged at left and right sides of the front frame 10, so that the four vertical beams 151 can define the driver foot space and a co-driver foot space 13.

As illustrated in the figure, the front bracket 15 further includes a crossbeam 152 and an auxiliary bracket 154. The crossbeam 152 is coupled to the at least two vertical beams 151, and the auxiliary bracket 154 is arranged on the crossbeam 152. In this way, the front bracket 15 is composed of the vertical beams 151, the crossbeam 152 and the auxiliary bracket 154, the structural strength of the front bracket 15 is higher, and the all-terrain vehicle 100 will be safer when driving.

Specifically, the instrument 50 is fixed on the auxiliary bracket 154, and at least two auxiliary brackets 154 abut on left and right sides of the fuel tank 30, so that the fuel tank 30 can be fixed in the left-and-right direction, and the fixation strength of the fuel tank 30 can be further improved.

Referring to FIGS. 1 and 2, a height of the fuel tank 30 is greater than a width of the fuel tank 30. In this way, the driver foot space and the co-driver foot space 13 can be separated by the fuel tank 30, and the normal operation of the driver can be prevented from being affected by the passenger. Moreover, the height of the fuel tank 30 is greater than the width of the fuel tank 30, the driver foot space 12 and the co-driver foot space 13 can be optimized, that is, the driver foot space 12 and the co-driver foot space 13 can be enlarged as much as possible, and the driving comfort of the driver and the passenger can be improved.

Certainly, the height of the fuel tank 30 can be smaller than the width of the fuel tank 30. In this way, the center of gravity of the fuel tank 30 is relatively low, and sloshing of the fuel in the fuel tank 30 is small, which is safer in the driving process of the all-terrain vehicle 100.

Alternatively, the height of the fuel tank 30 is much smaller than the width of the fuel tank 30, that is, the fuel tank 30 can be made relatively thin, and the fuel tank 30 can be arranged in the driver foot space 12 and the co-driver foot space 13, that is, the driver and the co-driver can step on the fuel tank 30, which can further reduce the occupied space of the fuel tank 30 and optimize the space design of the cockpit 11.

The fuel tank 30 has a tank filler, and the tank filler is located at the front or upper side of the fuel tank 30. Therefore, it is convenient to refuel the fuel tank 30.

In addition, the power battery 40 is fixed to the underframe 14 by bolts. Specifically, the underframe 14 is provided with a first mounting hole 145, and the edge of the power battery 40 is provided with a second mounting hole 41, and the bolt is fixedly coupled to the first mounting hole 145 after passing through the second mounting hole 41. The second mounting hole 41 can be a through hole, and the first mounting hole 415 is a screw hole.

Further, the underframe 14 is provided with a mounting boss 147, the mounting boss 147 is provided with the first mounting hole 145, the edge of the power battery 40 is provided with a mounting flange 43, and the mounting flange 43 is provided with the second mounting hole 41, so that the power battery 40 can be fixed on the underframe 14 when the bolts are fixedly coupled to the mounting boss 147 and the mounting flange 43.

The power battery 40 includes a housing and a battery module. The battery module is arranged in the housing, and the housing can play a role in protecting the battery module.

The power cabin 16 is located behind the driver seat 21 and the co-driver seat 22. In addition, since the engine 80 is arranged behind the fuel tank 30, it can ensure that the fuel tank 30 can normally supply fuel to the engine 80 while the influence of engine heat on the fuel tank 30 can be reduced because the engine 80 is slightly far away from the fuel tank 30, thus reducing the potential safety hazard, and improving the driving safety of the all-terrain vehicle 100. Moreover, by arranging the engine 80 behind the fuel tank 30 and the power battery 40, the size of the all-terrain vehicle 100 in the width direction can be reduced, making the overall structure of the all-terrain vehicle 100 more compact.

Further, as illustrated in the figure, a cylinder head of the engine 80 extends backward. Therefore, a distance between the cylinder head of the engine 80 and the fuel tank 30 can be further widened, thereby further reducing potential safety hazards and further improving the driving safety of the all-terrain vehicle 100. Moreover, due to the long distance between the cylinder head and the fuel tank 30, when the fuel tank 30 is arranged under the seats 20 and the engine 80 is located behind the fuel tank 30, the cylinder head is far away from the driver and the passenger, so the high temperature generated by the cylinder head of the engine 80 is not easily radiated to bodies of the driver and the passenger, and the riding comfort of the driver and the passenger is improved.

The driving motor 70 and the engine 80 are arranged at the left and right sides of the power cabin 16. Thus, the balance of counterweights of the whole all-terrain vehicle 100 in the left-and-right direction can be further ensured.

In the description of the present disclosure, it should be understood that, the azimuth or positional relationship indicated by terms "center," "vertical," "horizontal," "length," "width," "thickness," "up," "down," "front," "rear," "left," "right," "vertical," "horizontal," "top," "bottom," "inside," "outside," "clockwise," "counterclockwise," "axial," "radial" and "circumferential" is based on the azimuth or positional relationship illustrated in the attached drawings, which is only for the convenience of describing the present disclosure and simplifying the description, and does not indicate or imply that the device or element must have a specific orientation, be constructed and operated in a specific orientation, so it cannot be understood as a limitation of the present disclosure.

In the description of this specification, descriptions referring to the terms "one embodiment", "some embodiments", "exemplary embodiments", "examples", "specific example", or "some examples" mean that specific features, structures, materials or characteristics described in connection with this embodiment or example are included in at least one embodiment or example of the disclosure. In this specification, the schematic expressions of the above terms do not necessarily refer to the same embodiment or example.

Although the embodiments of the present disclosure have been illustrated and described, those skilled in the art can understand that many changes, modifications, substitutions and variations can be made to these embodiments without departing from the principles and purposes of the present disclosure, and the scope of the present disclosure is defined by the claims and their equivalents.

What is claimed is:

1. An all-terrain vehicle, comprising:
    a vehicle frame defining a cockpit;
    a driver seat and a co-driver seat, the driver seat and the co-driver seat being arranged in the cockpit, the cockpit being provided with a driver foot space in front of the driver seat and a co-driver foot space in front of the co-driver seat; and
    a fuel tank arranged in the cockpit, the fuel tank being located between the driver foot space and the co-driver foot space.

2. The all-terrain vehicle according to claim 1, further comprising a power battery, wherein the power battery is arranged on the vehicle frame, and is located behind the fuel tank.

3. The all-terrain vehicle according to claim 2, wherein the power battery is arranged in the cockpit, and the power battery is located below at least one of the driver seat or the co-driver seat.

4. The all-terrain vehicle according to claim 3, wherein a front end of the power battery extends forward beyond a front end of the driver seat and a front end of the co-driver seat, and a gap is defined between the front end of the power battery and a rear end of the fuel tank.

5. The all-terrain vehicle according to claim 1, further comprising an instrument, wherein the instrument is fixed to an upper part of vehicle frame, and is located above a rear part of the fuel tank.

6. The all-terrain vehicle according to claim 1, wherein the vehicle frame comprises an underframe and a front bracket, the front bracket is arranged at a front part of the underframe and extends upwards, and a bottom part of the fuel tank is fixed on the underframe.

7. The all-terrain vehicle according to claim 6, wherein the underframe comprises at least two bottom longitudinal beams, the at least two bottom longitudinal beams are arranged at intervals in a transverse direction and located at a middle part of the underframe in the transverse direction, and the bottom part of the fuel tank is fixed on the at least two bottom longitudinal beams.

8. The all-terrain vehicle according to claim 7, wherein the underframe comprises a bottom plate fixed on the at least two bottom longitudinal beams.

9. The all-terrain vehicle according to claim 6, wherein a front end of the fuel tank is fixed on the front bracket.

10. The all-terrain vehicle according to claim 9, wherein the front bracket comprises at least two vertical beams, the at least two vertical beams are arranged at intervals in a transverse direction and are located at the middle part of the front bracket in the transverse direction, and the front end of the fuel tank is fixed on the at least two vertical beams.

11. The all-terrain vehicle according to claim 10, wherein the front bracket further comprises a cross beam coupling the at least two vertical beams, and an auxiliary bracket arranged on the cross beam.

12. The all-terrain vehicle according to claim 11, wherein the front bracket comprises at least two auxiliary brackets, and the at least two auxiliary brackets abut on left and right sides of the fuel tank.

13. The all-terrain vehicle according to claim 1, wherein a height of the fuel tank is greater than a width of the fuel tank.

14. The all-terrain vehicle according to claim 1, further comprising a steering wheel arranged at a front side of the driver seat and at a rear side of the driver foot space.

15. The all-terrain vehicle according to claim 2, further comprising a driving motor and an engine, wherein the vehicle frame further defines a power cabin, the driving motor and the engine are arranged in the power cabin, the fuel tank is configured to supply fuel to the engine to drive the all-terrain vehicle, and the power battery is configured to power the driving motor to drive the all-terrain vehicle.

16. The all-terrain vehicle according to claim 15, wherein the power cabin is located behind the driver seat and the co-driver seat.

17. The all-terrain vehicle according to claim 16, wherein the driving motor and the engine is arranged in left and right sides of the power cabin.

18. The all-terrain vehicle according to claim 2, wherein the vehicle frame comprises an underframe, a bottom part of the fuel tank is fixed on the underframe; and the underframe is provided with a first mounting hole, an edge of the power battery is provided with a second mounting hole, and a bolt is fixedly coupled to the first mounting hole after passing through the second mounting hole.

19. The all-terrain vehicle according to claim 18, wherein the first mounting hole is a screw hole, and the second mounting hole is a through hole.

20. The all-terrain vehicle according to claim 18, wherein the underframe is provided with a mounting boss having the first mounting hole; and the edge of the power battery is provided with a mounting flange having the second mounting hole.

\* \* \* \* \*